(12) United States Patent
Schoneboom

(10) Patent No.: US 12,392,567 B2
(45) Date of Patent: Aug. 19, 2025

(54) HEAT EXCHANGER WITH VARYING SURFACE ROUGHNESS

(71) Applicant: DENSO International America, Inc., Southfield, MI (US)

(72) Inventor: Sean Schoneboom, Livonia, MI (US)

(73) Assignee: DENSO International America, Inc., Southfield, MI (US)

( * ) Notice: Subject to any disclaimer, the term of this patent is extended or adjusted under 35 U.S.C. 154(b) by 838 days.

(21) Appl. No.: 17/002,943

(22) Filed: Aug. 26, 2020

(65) Prior Publication Data

US 2021/0180888 A1 Jun. 17, 2021

Related U.S. Application Data

(60) Provisional application No. 62/946,587, filed on Dec. 11, 2019.

(51) Int. Cl.
| | |
|---|---|
| *F28D 13/00* | (2006.01) |
| *B33Y 80/00* | (2015.01) |
| *F28F 13/18* | (2006.01) |
| *F28D 1/047* | (2006.01) |

(52) U.S. Cl.
CPC ............ *F28F 13/185* (2013.01); *B33Y 80/00* (2014.12); *F28D 1/0471* (2013.01); *F28F 2260/00* (2013.01)

(58) Field of Classification Search
CPC .... F28F 1/40; F28F 13/02; F28F 13/12; F28F 13/185; F28D 1/0477; F28D 1/0478
See application file for complete search history.

(56) References Cited

U.S. PATENT DOCUMENTS

| | | | | |
|---|---|---|---|---|
| 5,213,138 A | * | 5/1993 | Presz, Jr. | ........... F15D 1/04 138/37 |
| 5,222,552 A | * | 6/1993 | Schuchert | ........... B21D 11/06 165/172 |
| 2009/0108134 A1 | | 4/2009 | Thodiyil et al. | |
| 2016/0010863 A1 | | 1/2016 | Ott et al. | |
| 2017/0167274 A1 | | 6/2017 | Itzel | |
| 2019/0178585 A1 | * | 6/2019 | de Bock | ........... F28F 9/0282 |

FOREIGN PATENT DOCUMENTS

| | | |
|---|---|---|
| GB | 2320929 B | 6/2001 |
| JP | 2010078256 A * | 4/2010 |
| WO | 2019170868 A1 | 9/2019 |

\* cited by examiner

*Primary Examiner* — Eric S Ruppert
(74) *Attorney, Agent, or Firm* — Dickinson Wright PLLC

(57) ABSTRACT

In embodiments, a heat exchanger includes a tube configured to transfer a first fluid. The tube includes an outer surface configured to exchange heat with a second fluid as the second fluid flows over the outer surface of the tube. The tube also includes an inner surface defining an interior configured to contain and transfer the first fluid, and a plurality of surface features integrally formed as part of the inner surface. The surface features may extend radially inward toward the interior, and are configured to increase a surface area of the inner surface to improve heat exchange between the tube and the first fluid.

10 Claims, 3 Drawing Sheets

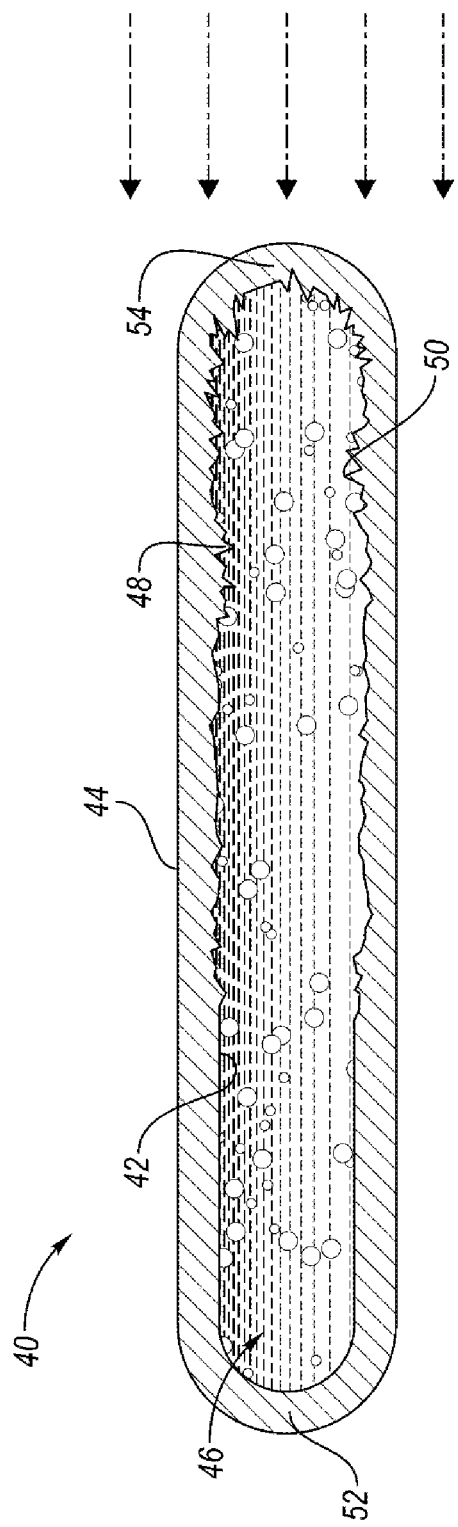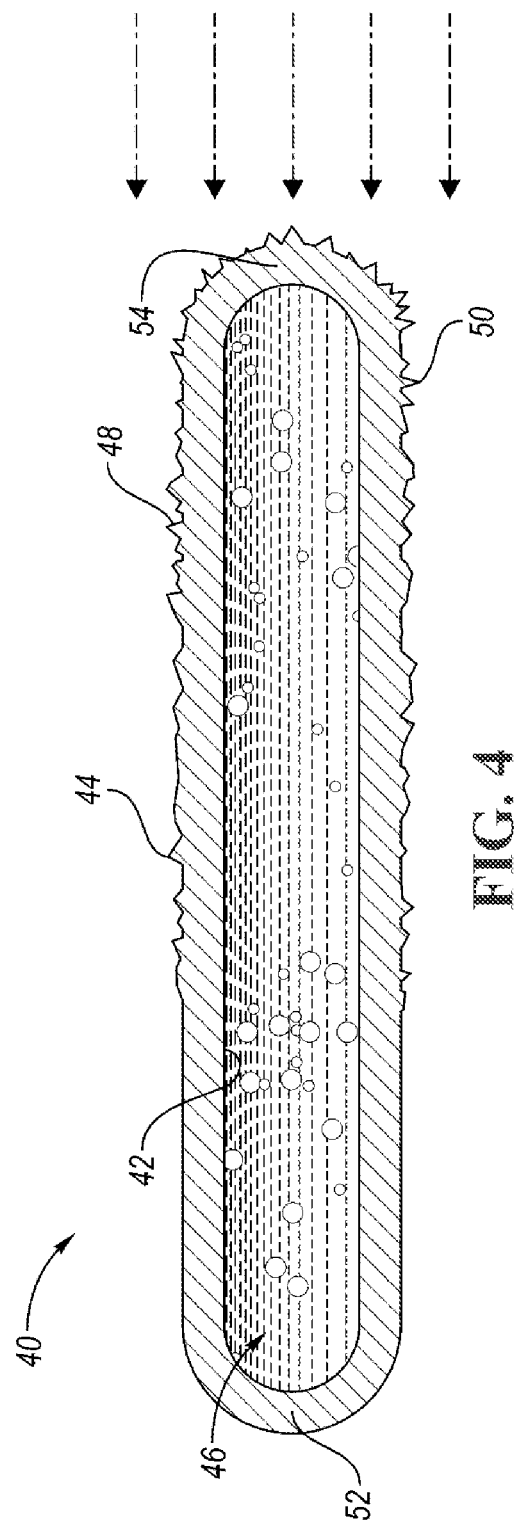

HEAT EXCHANGER WITH VARYING SURFACE ROUGHNESS

CROSS-REFERENCE TO RELATED APPLICATIONS

This application claims the benefit of U.S. provisional application Ser. No. 62/946,587 filed Dec. 11, 2019, the disclosure of which is hereby incorporated in its entirety by reference herein.

TECHNICAL FIELD

The present disclosure relates to a heat exchanger with varying surface roughness.

BACKGROUND

Heat exchangers can be used in a variety of applications to cool or heat associated components. In an automotive vehicle, heat exchangers can be found in the form of radiators, oil coolers, intercoolers, battery chillers, condensers, internal heat exchangers (IHXs), among others. Heat exchangers are also found in other non-vehicle applications, such as heating, ventilation, and air conditioning (HVAC) systems, appliances such as refrigerators, and the like. Heat exchangers typically include the passing of two fluids relative to one another, in which heat can exchange between the two fluids. For example, warm fluid can enter the heat exchanger and exits as a cooled fluid, by exchanging heat with a cold fluid that enters the heat exchanger and exits as a warmed fluid.

The two fluids can be separated by a solid patrician such as a tube, wall, or the like. The partition may have an intricate shape to direct the fluid from one specific area to another. The heat exchanger may include several partitions, and the respective temperatures of the two passing fluids may be different in various localized regions of the heat exchanger.

SUMMARY

According to one embodiment, a heat exchanger includes a tube configured to transfer a first fluid. The tube includes an outer surface configured to exchange heat with a second fluid as the second fluid flows over the outer surface of the tube, an inner surface defining an interior configured to contain and transfer the first fluid, and a plurality of surface features integrally formed as part of the inner surface, wherein the surface features extend radially inward toward the interior and are configured to increase a surface area of the inner surface to improve heat exchange between the tube and the first fluid.

In another embodiment, a 3D-printed heat exchanger includes a tube configured to transfer a first fluid. The tube includes an outer surface configured to contact a second fluid to transfer heat therewith, an inner surface defining an interior and configured to contain the first fluid therein, and a plurality of 3D-printed surface features formed therewith, wherein a first plurality of localized regions of the tube include the surface features, and a second plurality of localized regions of the tube do not include the surface features.

BRIEF DESCRIPTION OF THE DRAWINGS

FIG. 3 is a cross-sectional view of one of the tubes of the radiator, according to an embodiment.

FIG. 4 is cross-sectional view of one of the tubes of the radiator, according to another embodiment.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In automotive vehicle settings, various heat exchangers can be used to cool or heat associated components. For example, radiators cool engine coolant, condensers cool HVAC fluid, engine oil coolers cool engine oil, chillers cool battery components, etc. Other heat exchangers are known. These heat exchangers can be mounted at various locations throughout the vehicle. Radiators are typically mounted at the front of the vehicle, directly behind the front grill, allowing the heat exchanger to take advantage of incoming ambient air to cool fluid in the radiator as the vehicle is being driven.

Figure 1:
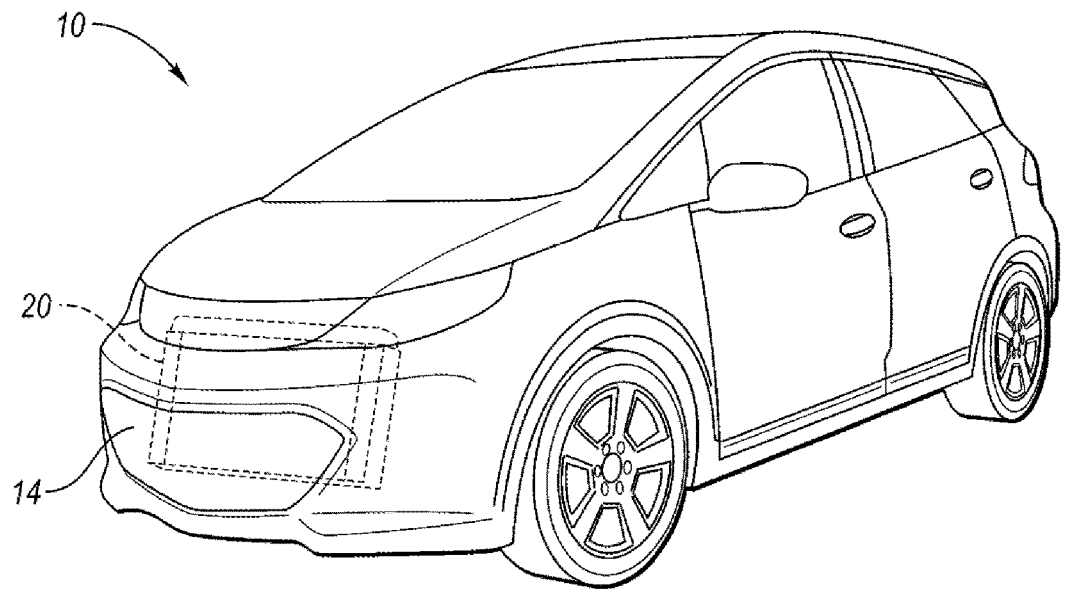
FIG. 1 is a perspective view of an automotive vehicle having a heat exchanger, in this case a radiator, according to an embodiment.

FIG. 1 illustrates a vehicle 10, in this case an automotive passenger vehicle, with the location of the radiator shown at 20 according to an embodiment. Radiators are typically mounted at the front of the vehicle, directly behind the front grill 14. This allows incoming air to flow across the tubes of the radiator as the vehicle is being driven. The passing of the ambient air across the tubes cools the coolant contained within the tubes.

Figure 2:
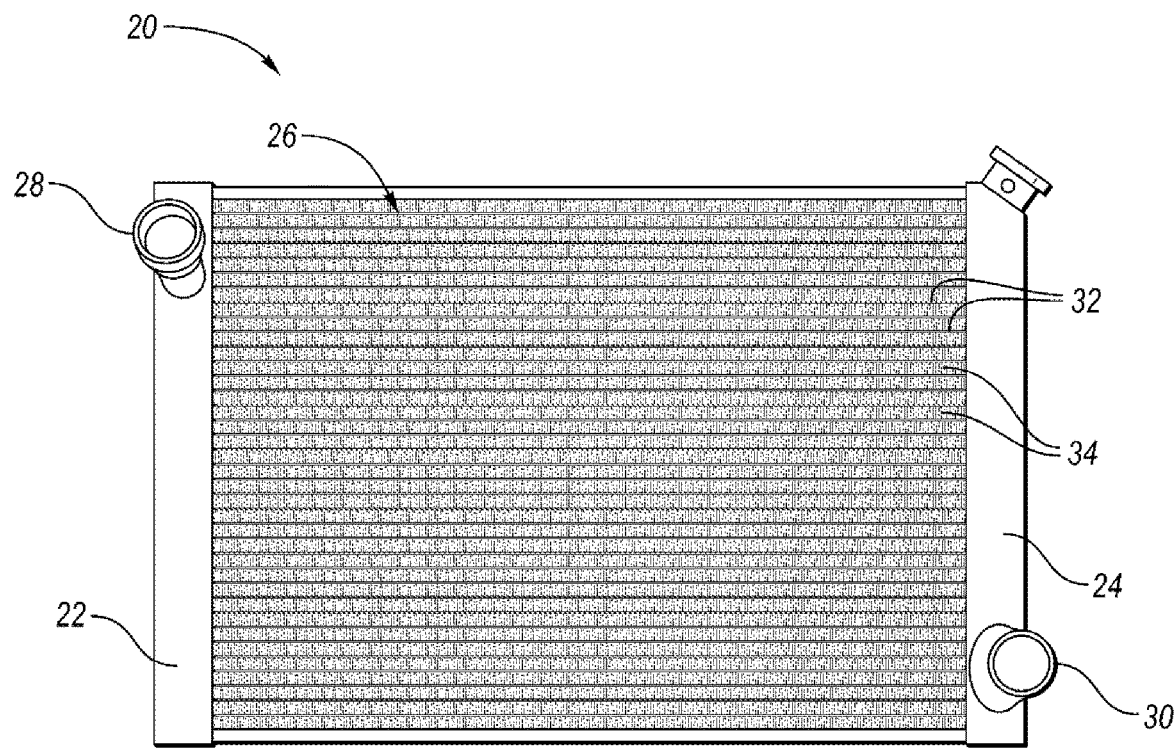
FIG. 2 is a front plan view of the radiator of FIG. 1, according to an embodiment.

FIG. 2 illustrates a front view of the radiator 20, according to an embodiment. As explained above, the radiator is but one type of heat exchanger that the teachings of this disclosure can be applied to. The radiator 20 includes an inlet header tank 22, an outlet header tank 24, and a core 26 disposed between the inlet header tank 22 and the outlet header tank 24. The inlet header tank 22 defines an inlet 28 through which fluid (e.g., engine coolant) enters the radiator 20. The outlet header tank 24 defines an outlet 30 though which the coolant exits the radiator 20.

The core 26 includes a plurality of tubes 32 and a plurality of fins 34 which extend between the inlet header tank 22 and the outlet header tank 24. The tubes 32 fluidly connect the inlet 28 to the outlet 30. The tubes 32 extend horizontally across the core 26 and in parallel fashion, with adjacent tubes 32 being connected by a row of the fins 34. Engine coolant, which may be in either a liquid or gaseous phase, flows from the inlet header tank 22, through the core 26, and to the outlet header tank 24. The core 26 cools the coolant flowing through the radiator 20. More specifically, the coolant flows through the tubes 32, and the fins 34 conduct or transfer heat from the coolant flowing through the tubes 32. Heat transferred to the fins 34 is transferred to ambient air flowing through the radiator 20. The ambient air can flow through the radiator 20 as supplied naturally when the vehicle is traveling, or via a fan (not shown).

The tubes 32 are typically manufactured by forming a thin piece or strip of metal, such as brass or aluminum. In one example, rollers bend the strip of metal into its flattened tube shape. The tube then runs through a vat of molten metal such as lead. As the tube exits the vat, it runs through water to cool and harden. A cutter cuts the tube to its desired length (e.g., the width of the radiator). The fins 34 are also manufactured by forming a thing piece or strip of metal, such as copper. In one embodiment, a machine shapes a narrow strip of copper into its alternating or sinusoidal shape. The tubes and fins can be stacked in alternating fashion, such as shown in FIG. 2. The stack of tubes and fins are then compressed together. If any tubes or fins become distorted or crooked during the process, they can be manually straightened out. Another metal sheet (e.g., brass) can be formed to shape to create the inlet and outlet header tanks, which can then be welded or soldered onto the sides of the stack. Inlet and outlet pipes are then welded into place.

This process can be timely, expensive, and prone to error that requires manual fixing. Moreover, the tubes and fins are formed form a very long, continuous sheet of metal, and are all formed in the same manner; thus, the tubes are intended to be uniform in size and shape throughout the entire core of the radiator.

Therefore, according to various embodiments described herein, a heat exchanger is manufactured by, for example, additive manufacturing (e.g., 3D printing of metal, 3D printing of synthetic material such as plastic, dust layering and binding, etc.) to include localized surface roughness to improve the heat exchange process. In one example, a tube that carries one of the fluids for the heat exchange process is manufactured to include surface roughness in particular, localized regions of the tube. Other areas of that tube, or other tubes in the heat exchanger, may be manufactured via additive manufacturing to not include such surface roughness. A customized heat distribution characteristic of the heat exchanger can thus be created via the additive manufacturing; further detail is provided below.

FIG. 3 illustrates a cross-section of a tube 40 of a heat exchanger. The tube 40 may be a tube of a radiator, such as the tubes 32 described with reference to FIG. 2. Alternatively, the tube 40 may be a tube of another heat exchanger, such as a battery chiller, an internal heat exchanger (IHX), evaporator, boiler, condenser, a heat exchanger of a refrigerator, [anything else worth listing?] and other types of heat exchanger. Unless otherwise noted, the tube 40 may also be a tube of a gas-to-gas heat exchanger, liquid-to-gas heat exchanger, or liquid-to-liquid heat exchanger. The tube 40 may be any fluid-carrying passageway in which heat is exchange between the fluid within the tube 40 and a second fluid passing around the outer surface of the tube 40. In the embodiment illustrated in FIG. 3, the fluid being carried within the interior of the tube 40 may be a gas or liquid refrigerant or coolant, and ambient air may flow across or over the exterior of the tube 40.

The tube 40 has an inner surface 42 and an outer surface 44. The inner surface 42 defines a hollow interior 46 of the tube 40 configured to transfer a first fluid within the heat exchanger. At least a portion of the inner surface 42 of the tube 40 is manufactured (e.g., via 3D printing) to include surface features 48. The surface features 48 may be a series of undulations, projections, peaks, corrugations, or the like. In the embodiment of FIG. 3, the surface features 48 include projections that extend radially inwardly toward a center of the interior 46.

The surface features 48 are configured to increase or maximize the surface area of the inner surface 42 that contacts the fluid flowing within the interior 48. In the illustrated embodiment, the surface features 48 project radially inwardly and have sharp peaks 50 located within the interior 46. At least some of these peaks may be formed to have sharp, acute angles such as between 10-50 degrees, or more particularly between 20-30 degrees.

In some embodiments, only a portion of the inner surface 42 is provided with the surface features 48. For example, the tube 40 may have a first end 52 and a second end 54 located at opposite width ends of the tube 40. The inner surface 42 at the first end 52 may be formed with a smooth inner surface, while the second end 54 may be formed with the surface features 48, as shown in FIG. 3. The surface features 48 may extend all the way around the second end 54, and beyond a center point of the tube 40, closer to the first end 52 than the second end 54. In other words, the surface features 48 may be located in a majority of the inner surface 42. The inner surface 42 at the first end 52 may be smooth, while the inner surface 42 at the second end 54 is volatile or rough due to the surface features 48. The tube 40 may be specifically manufactured in this way to promote a desired flow characteristic and increase heat transfer at the second end 54 of the tube 40. More heat transfer capability is provided at the second end 54 than the first end 52, due to the increase of surface area of the inner surface 42 at the second end 54.

Rather than, or in addition to, the inner surface 42 being provided with the surface features, the outer surface 44 can be provided with surface features. FIG. 4 illustrates an embodiment in which the inner surface 42 is smooth and has no surface features, and the outer surface 44 is rough in regions provided with surface features 48. In other words, the surface features 48 are now illustrated as extending outwardly from the outer surface 44. Thus, the fluid (e.g., ambient air in this example) flowing over the outer surface 44 directly contacts the surface features 48, instead of the embodiment of FIG. 3 in which the fluid within the interior 46 of the tube 40 directly contacts the surface features 48. The embodiment of FIG. 4 may be chosen when manufacturing the heat exchanger to improve the heat exchange between the outer fluid (e.g., ambient air) and the outer surface 44 in regions where such improved heat exchange is desired.

In another embodiment not shown, both the inner surface 42 and outer surface 44 are provided with the surface features 48. The surface features 48 may be provided at any location about or within the tube 40 to improve the localized heat transfer in that region of the tube 40, depending on the heat distribution of the overall heat exchanger.

The surface features 48 may be manufactured so as to be non-uniform. For example, the surface features 48 may vary in peak-to-peak distance, valley-to-valley distance, width, height, depth, and the like. Additive manufacturing such as 3D printing provides the ability to easily vary these relative sizes amongst the surface features 48 to provide customized heat distribution characteristics of the heat exchanger.

Figure 5:
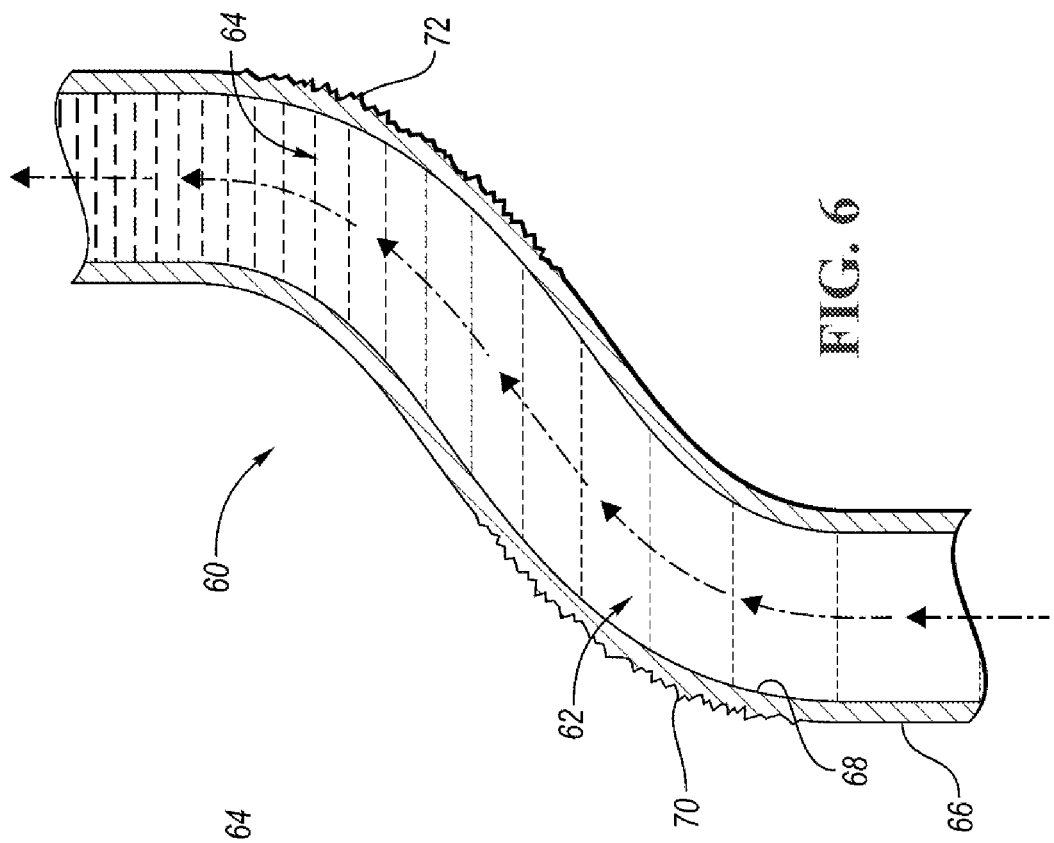
FIG. 5 is a cross-sectional view of a tube of another heat exchanger, such as a chiller, according to one embodiment.

FIG. 5 illustrates an embodiment of utilizing surface features in regions where the tube or fluid passage of a heat exchanger is curved, in that the tube extends along a curved path to define a corresponding curved flow path. In the embodiment of FIG. 5, an overhead cross-sectional view is provided of a tube 60. The tube 60 may be part of any of the heat exchangers listed above, but in this embodiment is a tube of a batter chiller. The tube 60 may be S-shaped, having a turn in one direction and then a turn in an opposite direction. For example, from the perspective of the view of FIG. 5, as fluid flows from the bottom of the tube 60 to the top of the tube 60, the fluid turns right along a first curve 62, and then turns left along a second curve 64.

The tube 60 has an inner surface 66, and an outer surface 68. At the first turn 62, the inner surface 66 is provided with first surface features 70. At the second turn 64, the inner surface 66 is provided with second surface features 72. The first and second surface features 70, 72 may be manufactured in the same manner as described above (e.g., 3D printing, etc.), with undulations, peaks, etc. with customized sizes, shapes, and orientations.

The surface features 70, 72 may be placed strategically along the curves of the tube 60 to maximize efficiency of heat exchange without significantly decreasing or disrupting the flow rate or pressure of the fluid within the tube 60. For example, the first surface features 70 may be located along the inside of the first curve 62, and the second surface features 72 may be located along the inside of the second curve 64. In other words, at the first curve 62 of the tube 60, the surface features are on the radially-inward inner surface of the tube 60, e.g., the portion of the tube 60 that is closer to the center point of the first curve 62. This would be the right-hand side of the inner surface 68 at the first curve 62, as looking at the orientation of FIG. 5. As the tube 60 curves in an opposite direction at the second curve 64, the first surface features 70 are no longer on that side of the tube 60, but are on the opposite side of the tube 60. In other words, at the second curve 64 of the tube 60, the surface features are on the radially-inward inner surface of the tube 60, e.g., the portion of the tube 60 that is closer to the center point of the second curve 64.

Said another way, the first curve 62 is curved in a first direction, with an inside of the first curve defined by a first portion 81 of the inner surface 68, and an outside of the first curve defined by an opposing second portion 82 of the inner surface 68. The second curve 64 is curved in a second direction opposite the first direction, with an inside of the second curve 64 defined by a third portion 83 of the inner surface 68, and an outside of the first curve defined by an opposing fourth portion 84 of the inner surface 68. The surface features 70 may be located at the first portion 81, and the surface features 72 may be located at the third portion 83 such that the surface features are provided along the inside of each curve 62, 64. The second portion 82 and fourth portion 84 may be smooth, e.g., not provided with such surface features. The first portion 81 is located opposite the second portion 82 relative to a centerline of the tube 60, and likewise the third portion 83 is located opposite the fourth portion 84 relative to the centerline.

In this embodiment, the surface features 70, 72 create a tube 60 with internal surface roughness that is greater on the inside of the curves of the tubes compared to the outside of the curves. The inner surface 68 at the inside of the curves 62, 64 may be provided with the respective surface features 70, 72, while the inner surface 68 at the outside of the curves 62, 64 may not be provided with such surface features. In one embodiment, the inner surface 68 at the outside of the curves 62, 64 is smooth with no such surface features such as projections or the like extending toward the interior of the tube 60. In another embodiment, the inner surface 68 at the outside of the curves 62, 64 is provided with surface features that are smaller in number or size than the surface features 70, 72 of the inner surface 68 at the inside of the curves 62, 64.

These surface features 70, 72 may be manufactured via additive manufacturing, as described above. The manufacturing of the surface features 70, 72 via additive manufacturing provides the ability to tailor the surface roughness at a granular, micro level. This allows the heat exchanger to be tailored with surface features that increase the efficiency of the heat exchanger without decreasing the fluid flow or pressure. The surface features 70, 72 can be positioned in locations where heat exchange may be lacking, and thus additional surface area of the material of the tube 60 can increase the heat exchanged in those regions.

Figure 6:
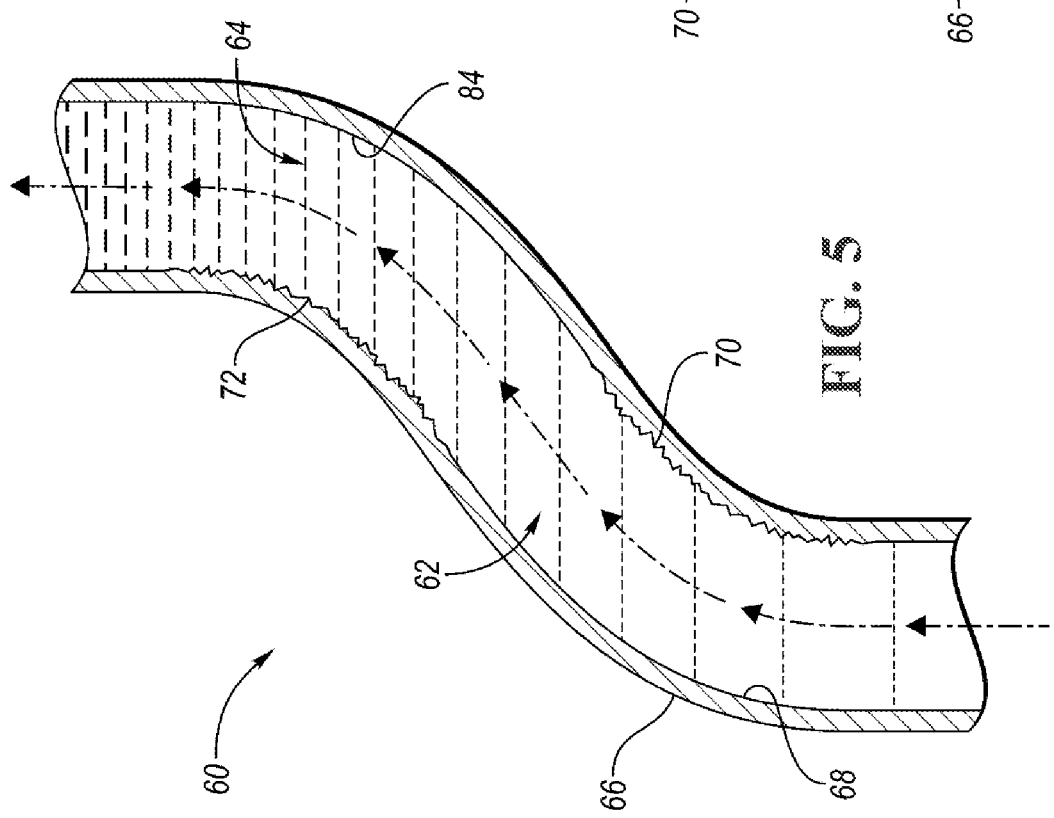
FIG. 6 is a cross-sectional view of a tube of a heat exchanger, such as a chiller, according to another embodiment.

Rather than, or in addition to, the inner surface 68 being provided with the surface features, the outer surface 66 can be provided with surface features. FIG. 6 illustrates an embodiment in which the inner surface 68 is smooth and has no surface features, and the outer surface 66 is rough in regions provided with surface features 70, 72. In other words, the surface features 70, 72 are now illustrated as extending outwardly from the outer surface 66 at the respective curves 62, 64. Thus, the fluid (e.g., ambient air, etc.) flowing over the outer surface 66 directly contacts the surface features 70, 72, instead of the embodiment of FIG. 5 in which the fluid within the interior of the tube 60 directly contacts the surface features 70, 72. The embodiment of FIG. 6 may be chosen when manufacturing the heat exchanger to improve the heat exchange between the outer fluid (e.g., ambient air) and the outer surface 66 in regions where such improved heat exchange is desired.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A heat exchanger comprising:
a tube configured to transfer a first fluid, the tube including:
an outer surface configured to exchange heat with a second fluid as the second fluid flows over the outer surface of the tube,
an inner surface defining an interior configured to contain and transfer the first fluid, and
a plurality of surface features integrally formed as part of the inner surface at a localized region of the tube, wherein the surface features extend radially inward toward the interior and are configured to increase a surface area of the inner surface to improve heat exchange between the tube and the first fluid, and wherein the outer surface of the tube is smooth and not provided with surface features at the localized region of the tube;
wherein a portion of the tube is S-shaped to define a corresponding S-shaped curved flow path for the first fluid, wherein the S-shaped tube includes a first curve that is curved in a first direction and a second curve downstream of the first curve that extends in a second direction opposite the first direction;
wherein at the first curve, a first portion of the inner surface of the tube is radially inward of a second portion of the inner surface of the tube;
wherein at the second curve, a third portion of the inner surface of the tube is radially inward of a fourth portion of the inner surface of the tube; and
wherein the surface features are located on the first and third portions of the inner surface, and wherein surface features are not provided on the second and fourth portions of the inner surface.

2. The heat exchanger of claim 1, wherein the tube is a 3D-printed tube.

3. The heat exchanger of claim 2, wherein the surface features are 3D printed integral with the inner surface and the tube.

4. The heat exchanger of claim 1, wherein the tube has a cross-sectional profile having a first rounded end and a second rounded end, wherein the first rounded end is smooth and not provided with the surface features, and wherein the second rounded end is provided with the surface features.

5. The heat exchanger of claim 1, wherein the second and fourth portions of the inner surface are smooth.

6. A 3D-printed heat exchanger comprising:
a tube configured to transfer a first fluid, the tube including:
an outer surface configured to contact a second fluid to transfer heat therewith,
an inner surface defining an interior and configured to contain the first fluid therein, and
a plurality of 3D-printed surface features formed therewith, wherein a first plurality of localized regions of the tube include the surface features on the inner surface but not on the outer surface, and a second plurality of localized regions of the tube do not include the surface features on the inner surface and the outer surface;
wherein a portion of the tube is S-shaped to define a corresponding S-shaped curved flow path for the first fluid, wherein the S-shaped tube includes a first curve that is curved in a first direction and a second curve downstream of the first curve that extends in a second direction opposite the first direction;
wherein at the first curve, a first portion of the inner surface of the tube is radially inward of a second portion of the inner surface of the tube;
wherein at the second curve, a third portion of the inner surface of the tube is radially inward of a fourth portion of the inner surface of the tube; and
wherein the surface features are located on the first and third portions of the inner surface, and wherein surface features are not provided on the second and fourth portions of the inner surface.

7. The 3D-printed heat exchanger of claim 6, wherein the tube has a cross-sectional profile having a first rounded end and a second rounded end, wherein the surface features are located at the first rounded end, and the second rounded end is smooth without such surface features.

8. The 3D-printed heat exchanger of claim 7, wherein the surface features are provided on the inner surface at the first end.

9. The 3D-printed heat exchanger of claim 7, wherein the surface features are provided on the outer surface at the first end.

10. The heat exchanger of claim 1, wherein at the first curve and the second curve, the outer surface of the tube is smooth and not provided with surface features.

* * * * *